United States Patent [19]

Bunge

[11] Patent Number: 4,490,839
[45] Date of Patent: Dec. 25, 1984

[54] METHOD AND ARRANGEMENT FOR SOUND ANALYSIS

[75] Inventor: Ernst Bunge, Hamburg, Fed. Rep. of Germany

[73] Assignee: U.S. Philips Corporation, New York, N.Y.

[21] Appl. No.: 463,414

[22] Filed: Feb. 3, 1983

Related U.S. Application Data

[63] Continuation of Ser. No. 107,222, Dec. 20, 1979, abandoned, which is a continuation of Ser. No. 902,928, May 5, 1978, abandoned.

[30] Foreign Application Priority Data

May 7, 1977 [DE] Fed. Rep. of Germany ....... 2720666

[51] Int. Cl.³ .............................................. G10L 1/00
[52] U.S. Cl. ...................................... 381/47; 381/103
[58] Field of Search ................................... 381/41–43, 381/47; 364/574, 553; 333/18, 28 R, 17 R; 375/12

[56] References Cited

U.S. PATENT DOCUMENTS

| 3,755,627 | 8/1973 | Berkowitz et al. | 179/1.5 D |
| 4,032,711 | 6/1977 | Sambur | 179/1.5 B |
| 4,141,072 | 2/1979 | Perreault | 375/12 |
| 4,227,046 | 10/1980 | Nakajima et al. | 179/1 D |

FOREIGN PATENT DOCUMENTS 1433770 4/1976 United Kingdom ............. 179/1.5 B

OTHER PUBLICATIONS

E. Bunge, "Speaker Recognition by Computer", Phillips Tech. Rev. 37, No. 8, 1977, pp. 207-219.
A. Rosenberg, "Automatic Speaker Verification", IEEE Proc., Apr. 1976, pp. 475-485.
B. Atal, "Automatic Recognition of Speakers", IEEE Proc., Apr. 1976, pp. 460-474.

Primary Examiner—E. S. Matt Kemeny
Attorney, Agent, or Firm—Robert T. Mayer; Bernard Franzblau

[57] ABSTRACT

For sound analysis, especially for speaker identification, a long-term spectrum is often formed from the recorded signal and compared to a long-term spectrum of a previously recorded signal. When the signal is, for example, received over telephone lines the transfer function thereof may distort the received signal to such an extent that identification is impossible. It is now proposed not to use the long-term spectrum for identification but rather its change, that is to say to accumulate the difference between two consecutive short-term spectra or the difference between such short-term spectrum and the long-term spectrum and to divide this accumulated value by the long-term spectrum in a Divider. Since the numerator and denominator each contain the frequency-weighting factor ($a_j$) of the telephone line transfer function, this factor is effectively cancelled out by virtue of the division operation performed in the Divider thereby eliminating the effect of the unknown transfer function. As a result the influence of the transfer function of the transmission path disappears almost completely.

26 Claims, 2 Drawing Figures

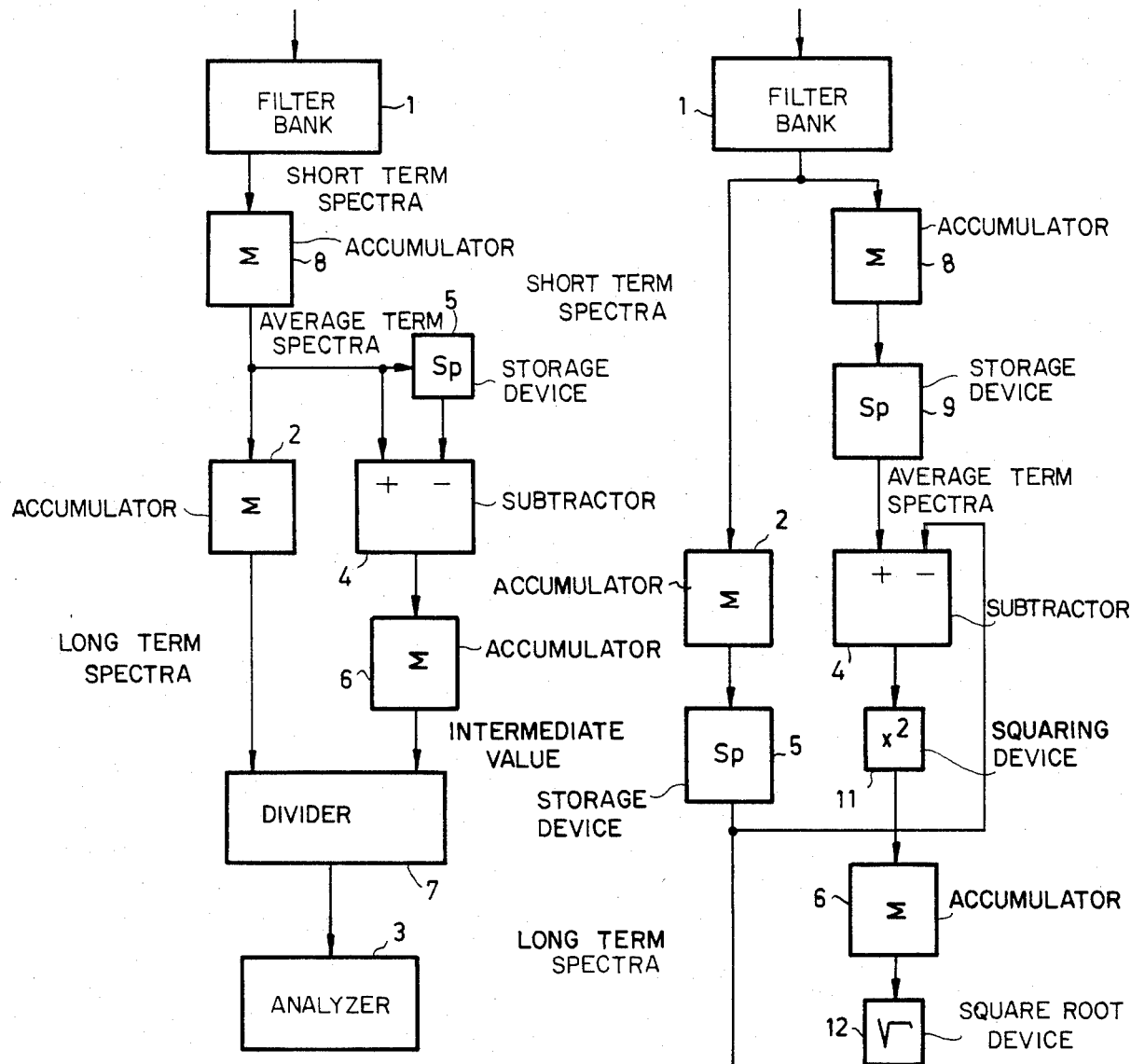

METHOD AND ARRANGEMENT FOR SOUND ANALYSIS

This is a continuation of application Ser. No. 107,222, filed Dec. 20, 1979, now abandoned, which is a continuation of Ser. No. 902,928, filed May 5, 1978, now abandoned.

The invention relates to a method of and an arrangement for sound analysis, more particularly for speaker and speech identification of a sound recorded during a limited period of time, especially from a spoken text, which is converted into an electrical signal. Short-term spectra with partial signals are produced from the signal in consecutive short periods (e.g. 10 ms–20 ms), said partial signals indicating the energy content of the sound in adjacent spectral ranges, and all short-term spectra are summed to form one long-term spectrum and at least the long-term spectrum is applied to an arrangement for analysing the sound or text, respectively.

For further background information on speaker and speech identification, reference may be made to the articles in the "Proceedings of the IEEE", Vol. 64, No. 4, Apr. 1976 by A. E. Rosenberg (pgs. 475–487) and the references cited in said article and the article by B. S. Atal (pgs. 460–475) and the references cited therein.

Such speech spectra have been used with success up to the present for sound analysis, particularly also for speech and speaker identification. For example, the identification of a speaker can be used in the banking business for the situation in which a customer gives an instruction orally and verification of the customer's identity is done by means of his speech, that is to say a recorded speech sample is compared in the analyser arrangement with a prior speech sample of the customer.

It is also desirable that a customer be able to give such an oral instruction with associated verification over the telephone. In the transmission of speech over a telephone line the speech signal is, however, affected by the always different transfer functions of the transmission path. The speech signal can be changed to such an extent that a subsequent identification by means of automatic systems is greatly hampered or even impossible. This also applies to other sounds which are, for example, transmitted for monitoring purposes to a monitoring central station and compared there with standard sounds.

It is an object of the invention to provide a method of sound analysis or speech and speaker identification, respectively, in which the disturbing influence of transfer functions of the transmission path between the sound source and the analyser arrangement are eliminated to a very large extent. The invention fulfills this object by forming for each short-term power spectrum the difference to the preceding short-term spectrum or to the long term spectrum, by deriving an intermediate value from the total number of differences and by dividing this intermediate value by the long-term spectrum and by applying the quotient to the sound analyser arrangement. Each of the two input terms to be divided includes the frequency-weighting factor ($a_j$) of the telephone line transfer function, which factor is cancelled out by the dividing operation to thereby eliminate the effect of the unknown telephone line transfer function. Consequently, the changes in the long-term spectrum are used as a characteristic feature for the analysis instead of the long-term spectrum itself. As those changes relate to a long-term spectrum, the influence of a linear transfer function which can be represented as a vector of the coefficients in the individual spectral ranges is completely eliminated in the ideal case, as can be easily deduced mathematically. If the difference to the preceding average value is formed, the differences can immediately be processed in parallel with the speech signal, while the formation of the difference to the long-term spectrum can only be performed at the end of the period so that the long-term spectra must therefore be stored in an intermediate store.

Deriving the intermediate values can be done in various ways. Efficiently, the derived intermediate value is the square root of the sum of the squares of the differences divided by the number of differences. In this way the so-called standard deviation is determined. Another possibility consists in that the derived intermediate value is the sum of the amounts of the differences divided by the number of differences. This possibility is somewhat easier and somewhat cheaper.

In accordance with the invention, two distinct quotients $Q_1$ and $Q_2$ are obtained:

$$Q_1 = \frac{F(ST_1 - ST_2)}{LT}$$

$$Q_2 = \frac{F(ST_1 - LT)}{LT}$$

where $F(\ldots)$ indicates a function of the quantity within the parentheses, said function representing the aforesaid "intermediate values". These functions, as described above, may be expressed as, for $Q_1$:

$$F_{11}(ST_1 - ST_2) = \frac{1}{N} \sum^N (ST_1 - ST_2)$$

$$F_{12}(ST_1 - ST_2) = \frac{1}{N} \sqrt{\sum^N (ST_1 - ST_2)^2}$$

and for $Q_2$ as:

$$F_{21}(ST_1 - LT) = \frac{1}{N} \sum^N (ST_1 - LT)$$

$$F_{22}(ST_1 - LT) = \frac{1}{N} \sqrt{\sum^N (ST_1 - LT)^2}$$

Efficiently, the differences are formed from average time spectra which represent the average value of a predetermined number of consecutive short-term spectra. In this case only a small number of signals need be stored and the required processing rate of the whole arrangement becomes lower. With a proper choice of the number of consecutive short-term spectra which are combined, that is to say with a proper choice of the periods for each average value spectrum, the identification possibility is, in addition, improved.

Known arrangements used for performing the procedure mentioned in the preamble comprise a filter unit receiving the sound to be analysed and successively producing at at least one output terminal signals in correspondance with the consecutive short-time spectra, a first accumulator connected to the output of the filter unit for producing signals in accordance with the long-term spectra, and an analyser arrangement. An arrangement for performing the method according to the invention is implemented by providing a subtractor arrangement having one input connected to the output of the filter unit. The other input of the subtractor is connected to the output of a store so that the subtractor produces an output signal indicating the difference between the values of the signals applied to these two inputs. A second accumulator is connected to the output of the subtractor arrangement for adding the amounts of the applied differences so as to form the intermediate value. The outputs of the first accumulator and the second accumulator are connected to the inputs of a divider arrangement which forms signals at the output corresponding to the quotients of the values in correspondance with the signals at the two inputs, and the output of the divider arrangement is connected to the input of the analyser arrangement. In this manner the method according to the invention is realised using only a few additional sections to that required for the known arrangements.

For forming the differences from consecutive short-term spectra it is sufficient that the input of the store be connected to the output of the filter unit and that it supplies at its output the received signal at the instant the next value of the same spectral range appears at the input. Consequently this store need only store the values of one short-term spectrum.

For forming the difference to the long-term spectrum it is, on the contrary, sufficient that the input of the store be connected to the output of the first accumulator and that one input of the subtractor arrangement be connected to a second store connected to the output of the filter unit for storing all the signals produced during the limited period of time and supplying them consecutively to the subtractor arrangement at the end of this period. As the long-term spectrum is not available until the end of the period during which the sound is recorded, the differences cannot be calculated until after that instant so that all short-term spectra must be intermediately stored in the second store. The first store can be dispensed with when the first accumulator already includes a store for each output value. A further elaboration for determining the standard variation is characterized in that the second accumulator is preceded by a squaring arrangement and followed by a square root extraction arrangement.

To combine each time several consecutive short-term spectra it is efficient to connect a third accumulator between the output of the filter unit and the input of the subtracting arrangement or the first or second stores, respectively. This accumulator can, in principle, be set-up in the same manner as the first and the second accumulator. The first accumulator can be connected directly to the output of the filter unit or to the output of the third adder arrangement.

It is also conceivable that the short-term spectra and the average term spectra as well as the long-term spectra each consist of one value for each spectral range. These individual values must be processed separately during the processing steps. As the processing steps are the same for each spectral value, the values of each spectral range can be consecutively processed in one processing step so that only one arrangement is each time required, but possibly a corresponding number of intermediate stores. To further increase the processing rate it is efficient that at least some of the adder arrangements and/or the subtracting arrangement and/or the divider arrangement consist of a number of parallel elements, which number does not exceed the number of adjacent spectral ranges, these elements each time producing separately and simultaneously the signals for several to all spectral ranges. However, this implementation requires additional cost and trouble and is therefore only necessary if particularly high requirements are imposed on the processing rate.

The arrangements for performing the individual processing steps can also be combined and realized by means of a correspondingly programmed multi-purpose computer, for example a micro-processor.

Embodiments of the invention will now be further explained with reference to the drawing in which:

FIG. 1 shows the block diagram of an arrangement according to the invention, and FIG. 2 shows another implementation of the arrangement according to the invention.

In FIG. 1 the sound to be analysed is applied to filter unit 1. This filter unit comprises a plurality of filters with adjacent passbands. The outputs of these filters can be led out directly via respective rectifiers and low-pass filters as described, for example, in the above-cited IEEE article by A. E. Rosenberg, and elsewhere. Often, however, the outputs of the filters lead to a multiplexing arrangement which scans these output values successively in a cyclic manner and passes them to an output of the filter unit. The cycling time of the multiplexer is then, in general, in the range of from 1 to 20 ms. This means that the individual values of successive short-time spectra are supplied consecutively and that the distance between two successive short-time spectra is equal to the cycling time of the multiplexer. The example of FIG. 1 shows a filter unit having one multiplex output only.

Connected to the output of the filter unit is an accumulator 8 which each time adds a number of consecutive short-term spectra, that is to say each spectral component separately and successively. To this end adder 8 comprises preferably an adder arrangement as well as a shift register connected thereto having a number of stages equal to the number of spectral ranges. Each stage of the shift register comprises a plurality of parallel storage positions equal to the maximum number of bits which can occur in the binary number indicating a spectral component in the average-term spectra. Each time the filter unit supplies a new signal for a spectral component, the associated value obtained so far by means of addition has arrived at the shift register output, and the two values are added together and written into the first stage of the shift register, the oldest content which is then no longer required being removed from the shift register. After the predetermined number of short-term spectra the output of the shift register is switched over to the output of accumulator 8 and the next addition of the spectral components starts again at zero value. The division by the number of added short-term spectra for forming the average value is particularly simple if this number is an integral power of 2. In the other case a divider must be included between the output of the shift register and the output of adder 8. This basic implementation of accumulator 8 is known per se and is not an object of the invention.

The output of accumulator 8 is connected to the input of a further accumulator 2 which adds all average-termed spectra separately on the basis of the individual spectral values and which can be implemented in the same manner as accumulator 8, but for the fact that it has a correspondingly higher number of positions.

In addition, the output of accumulator 8 is connected to an input of a subtractor 4 and to a store 5 whose output is connected to the other subtracting input of subtractor 4. If store 5 delays the received signals for a number of steps equal to the number of spectral ranges, the spectral value available at the output of store 5 is the same as that at an input of subtractor 4, but for the fact that the former is the spectral value of the preceding spectrum. To accomplish this, store 5 can be implemented as a shift register having a number of stages equal to the number of spectral values, each stage having a number of storage positions corresponding to the highest possible number of bits for a spectral value.

The subtractor 4 is arranged for processing two multibit binary numbers and has also a fundamentally known structure, for example subtraction by means of adding the complement values.

The output of subtractor 4 is connected to the input of accumulator 6 which can also be implemented in the same manner as accumulator 8. This accumulator 6, however, processes only the absolute values of the number supplied by subtractor 4, that is to say without taking the sign into account, and provides at its output the so-called intermediate value.

The outputs of adders 2 and 6 are connected to the inputs of a divider 7 which divides the value at the output of accumulator 6 by the value at the output of accumulator 2. This can, for example, be done in known manner by continuous subtraction, for which divider 7 is implemented in known manner.

In the described example the adders 2 and 6 need not supply the sum divided by the number of added values but the sums can be directly applied to divider 7 as the divisor, which is substantially the same for the two sums, is cancelled when these two values are divided. The slight deviation produced owing to the fact that accumulator 6 adds, owing to the difference formation of each time two consecutive values in subtractor 4, one value less than accumulator 2 can be neglected in most cases. The adders 2 and 6 supply the output values to the divider 7 consecutively and also separated on the basis of spectral values, so that the values for the consecutive spectral ranges appear successively at the output of this divider. These values are supplied to an analyser arrangement 3 and compared therein to a plurality of values obtained in the same manner. Analyser arrangement 3 can be a similarly programmed multipurpose computer and does not form a part of the invention.

FIG. 2 shows a similar arrangement in which the elements corresponding to the elements in FIG. 1 have been given the same reference numerals. Here the output of filter unit 1 is connected in parallel to adders 8 and 2, which may be implemented in the same manner as described with reference to FIG. 1. The output of accumulator 8 is connected to a store 9 which stores all the signals produced by accumulator 8 during the limited period of sound recording or speech transmission. In parallel therewith the long-term spectrum is again formed in accumulator 2, separated on the basis of spectral ranges, and entered into store 5 at the end of the period.

The output of store 5 is again connected to the subtracting input of subtractor 4, the other input of which is connected to the output of store 9. If the sound has been fully recorded, store 5 consequently contains the long-term spectrum whose spectral portions are successively and in cyclic manner applied to subtractor 4. Simultaneously the corresponding spectrum components of the average-term spectra, stored in store 9, are applied to subtractor 4 whose output is connected to the input of a squaring device 11. By means of the squaring operation, all the numbers appearing at the output of squaring device 11 have a positive sign and are added in accumulator 6. In this example accumulator 6 and also accumulator 2 must comprise a divider arranged before the output, which each time divides the sums by the number of individual values. The output signal of accumulator 6 is furthermore applied to a root extraction device 12 which forms the root of the values supplied by accumulator 6 at the end of the processing operation, i.e. the aforesaid intermediate value.

The outputs of store 5 and root extractor 12 are connected to the inputs of divider 7 which supplies at its output the individual spectral values of the standard deviation and applies them to analyser arrangement 3. This arrangement does not actually operate in real time, properly speaking, as the formation of the differences and their further processing can not start until the sound has been fully recorded at the end of the limited period of time. It is therefore not possible until that instant to process successively all spectral values of all short-term spectra.

With a long cycle time of the multiplexer in the filter unit 1 the formation of average-term spectra in accumulator 8 markedly reduces the attainable accuracy. In this case it is possible to omit accumulator 8 and to connect the output of the filter unit 1 directly to the input of accumulator 2 and store 9 or to the input of the subtracting arrangement 4 and the store 5, respectively. This depends on the cycling time of the multiplexer and the highest oscillation frequency of the processed spectra. On the other hand it is advantageous, particularly in speech or speaker identification, to produce a given number of short-term spectra and by means of adder 8 to process them further to attain an optimum identification result.

If a high processing rate is required, that is to say the identification result must already be available immediately after the end of the period of the recorded sound it may be necessary, especially for the arrangement shown in FIG. 2, to provide a plurality of elements arranged between the output of filter unit 1 and the inputs of analyser arrangement 3 so that each element successively processes only a portion of the total spectral values and several values of the same spectrum can be processed in parallel. This raises the processing rate by a corresponding factor and, in the limit case, a real time situation is in practice obtained again in the case of one separate arrangement for each single spectral value.

The elements arranged between the output of filter unit 1 and the input of analyser arrangement 3 can also be combined in an arithmetic and logic unit which is programmed correspondingly, for example in a microprocessor.

What is claimed is:

1. A method of sound analysis of a sound produced during a limited period of time and which is converted into an electrical sound signal comprising the steps of producing short-term spectrum signals from said signal in consecutive short time intervals, said short-term spectrum signals indicating the energy content of the sound in adjacent spectral ranges, summing all short-term spectra to form a long-term spectra, forming the difference between each short-term spectrum and the preceding short-term spectrum, deriving an intermediate value from all said differences and dividing said intermediate value by the long-term spectrum to form a quotient, and applying the quotient to an arrangement for sound analysis.

2. A method as claimed in claim 1 wherein the derived intermediate value is obtained by deriving the square root of the sum of the squares of the differences divided by the number of differences.

3. A method as claimed in claim 1 wherein the derived intermediate value is obtained by deriving the sum of the amounts of the differences divided by the number of the differences.

4. A method as claimed in claim 1 wherein the differences are formed by first deriving average-term spectra from the short-term spectra, said average-term spectra representing the average value of a predetermined number of consecutive short-term spectra, and then forming said differences between consecutive average-term spectra.

5. A method as claimed in claim 1, further comprising the step of converting said short-term spectrum signals into average-term spectra signals representing the average value of a predetermined number of consecutive short-term spectra before they are summed to form said long-term spectra and before the step of forming the difference so that said differences are formed from average-term spectra.

6. A system for analyzing electrical sound signals representative of sounds produced during a limited period of time comprising, a filter bank for receiving the sound signals to be analyzed and successively producing at an output thereof signals corresponding to the consecutive short-term spectra with each short-term spectrum indicating the energy content of the sound signal in adjacent spectral ranges, a first accumulator connected to the output of the filter bank for producing signals in correspondence with the long-term spectrum, an analyzer arrangement, a storage device, first means coupling an input of the storage device to the output of the filter bank, a subtractor arrangement having one input coupled to the output of said filter bank and a second input connected to the output of the storage device for producing an output signal indicating the difference between the values of the signals applied to the two inputs, a second accumulator coupled to the output of the subtractor arrangement for accumulating the amounts of the applied differences, second means coupling an output of the first accumulator and an output of the second accumulator to first and second inputs, respectively, of a divider which has an output at which are formed signals corresponding to the quotient of the values in correspondence with the signals at the two inputs, and means connecting the output of the divider to an input of the analyzer arrangement.

7. A system as claimed in claim 6, wherein the storage device includes means for supplying at its output the received signal at the instant that the next value of the same spectral range appears at the input of the storage device.

8. A system as claimed in claim 6, wherein said first and second coupling means are arranged to connect said first accumulator and said storage device in cascade between the output of the filter bank and the first input of the divider, and wherein said one input of the subtractor arrangement is coupled to the output of the filter bank by connecting it to an output of a second storage device having an input coupled to the output of the filter bank whereby all signals produced during the limited period of time are stored and successively supplied to the subtractor arrangement at the end of said limited period.

9. A system as claimed in claim 8, wherein the second coupling means comprises a squaring device and a square root extracting device, and means connecting the squaring device, the second accumulator and the square root extracting device in cascade in the order named between the output of the subtractor arrangement and the second input of the divider.

10. A system as claimed in claim 8, wherein the input of the second storage device is coupled to the output of the filter bank by means of a third accumulator connected between the output of the filter bank and said input of the second storage device.

11. A system as claimed in claim 6, wherein said first coupling means further comprises a third accumulator connected between the output of the filter bank and the one input of the subtractor arrangement, the input of the storage device and the input of the first accumulator.

12. A system as claimed in claim 6, wherein at least one accumulator and/or the subtactor arrangement and/or the divider include a number of parallel elements at most equal to the number of adjacent spectral ranges, which elements separately and simultaneously produce the signals for several to all spectral ranges.

13. A method of analyzing electric sound signals subject to a variable transfer characteristic comprising the following steps: producing short-term spectrum signals from said electric sound signals in consecutive short time intervals which short-term spectrum signals represent the energy content of the sound in adjacent spectral ranges, summing said short-term spectrum signals to form a long-term spectra, forming the difference betweem each short-term spectrum and the long-term spectrum, deriving an intermediate value from all said differences formed, dividing said intermediate value by the long-term spectrum to form a quotient, and applying said quotient to an arrangement for sound analysis.

14. A method as claimed in claim 13, wherein said intermediate value deriving step comprises the steps of forming the sum of the squares of said differences, dividing said sum by the number of the differences, and deriving the square root of the result of said dividing step to produce said intermediate value.

15. A method as claimed in claim 13, further comprising the step of converting said short-term spectrum signals into average-term spectra signals representing the average value of a predetermined number of consecutive short-term spectra before they are summed to form said long-term spectra and before the step of forming the difference so that said differences are formed from average-term spectra.

16. A system for analyzing electric sound signals subject to a variable transfer characteristic comprising, a filter bank for receiving the sound signals to be analyzed and successively producing at an output thereof signals corresponding to the consecutive short-term spectra with each short-term spectra indicating the energy content of the sound signal in adjacent spectral ranges, first means for coupling a first accumulator to the output of the filter bank for producing a long-term spectrum signal from the sum of the short-term spectra signals, a sound analyzer device, a signal storage device, a subtractor device having first and second inputs and an ouput, second means coupling the first input of the subtractor device to the output of the filter bank, third means coupling the storage device between the second input of the subtractor device and the output of the filter bank whereby the subtractor device produces a signal at its output terminal which indicates the difference between the signals applied to the first and second inputs thereof, a second accumulator, a divider having first and second inputs and an output, fourth means for coupling the second accumulator between the output of the subtractor device and the second input of the divider, fifth means for coupling an output of the first accumulator to said first input of the divider whereby the divider produces an output signal corresponding to the quotient of the signals at its first and second inputs, and means connecting the output of the divider to an input of the sound analyzer device.

17. A system as claimed in claim 16, wherein the storage device includes signal delay means whereby an input signal applied thereto appears at its output at the same time that the next signal value of the same spectral range appears at the output of the filter bank.

18. A system as claimed in claim 16, wherein said first, second and third coupling means comprise a third accumulator having an input coupled to the output of the filter bank and an output coupled to an input of the first accumulator, to an input of the storage device and to the first input of the subtractor device.

19. A system as claimed in claim 16, wherein said second coupling means comprises a third accumulator and a second storage device connected in cascade between the output of the filter bank and the first input of the subtractor device.

20. A system as claimed in claim 16, wherein said first and third coupling means are arranged to couple said first accumulator and the first storage device in cascade between the output of the filter bank and the second input of the subtractor device.

21. A system as claimed in claim 20, further comprising a squaring device and a square root device, and wherein said fourth coupling means is arranged to couple the squaring device, the second accumulator and the square root device in cascade between the output of the subtractor device and the second input of the divider.

22. A system as claimed in claim 16, further comprising a squaring device and a square root device, and wherein said fourth coupling means is arranged to couple the squaring device, the second accumulator and the square root device in cascade between the output of the subtractor device and the second input of the divider.

23. A system for analyzing electric sound signals subject to a variable transfer characteristic comprising, a filter bank for receiving the sound signals to be analyzed and successively producing at an output terminal thereof signals corresponding to the consecutive short-term spectra with each short-term spectra indicating the energy content of the sound signal in adjacent spectral ranges, first means for coupling a first accumulator to the output terminal of the filter bank for producing a long-term spectrum signal from the sum of the short-term spectra signals, a sound analyzer device, a signal storage device, a subtractor device having first and second inputs and an output, second means coupling the first input of the subtractor device to the output terminal of the filter bank, third means coupling the storage device between the second input of a subtractor device and an output of the first accumulator whereby the subtractor device produces a signal at its output terminal which indicates the difference between the signals applied to the first and second inputs thereof, a second accumulator, a divider having first and second inputs and an output, fourth means for coupling the second accumulator between the output of the subtractor device and the second input of the divider, fifth means for coupling the storage device between the output of the first accumulator and said first input of the divider whereby the divider produces an output signal corresponding to the quotient of the signals at its first and second inputs, and means connecting the output of the divider to an input of the sound analyzer device.

24. A method of sound analysis of a sound produced during a limited period of time which is converted into an electrical sound signal comprising the steps of producing short-term spectrum signals from said signal in consecutive short time intervals, said short-term spectrum signals indicating the energy content of the sounds in adjacent spectral ranges, summing all short-term spectra to form a long-term spectrum, forming the difference between each short-term spectrum and the long-term spectrum, deriving an intermediate value from all said differences and dividing said intermediate value by the long-term spectrum to form a quotient, and applying the quotient to an arrangement for sound analysis.

25. A method as claimed in claimed in claim 24, wherein the derived intermediate value is obtained by deriving the sum of the differences divided by the number of the differences.

26. A method as claimed in claim 24, wherein the differences are formed by first deriving average-term spectra from the short-term spectra, said average-term spectra representing the average value of a predetermined number of consecutive short-term spectra, and then forming said differences between consecutive average-term spectra.

* * * * *